United States Patent [19]
Burack et al.

[11] Patent Number: 5,259,051
[45] Date of Patent: Nov. 2, 1993

[54] OPTICAL FIBER INTERCONNECTION APPARATUS AND METHODS OF MAKING INTERCONNECTIONS

[75] Inventors: John J. Burack, Toms River, N.J.; William R. Holland, Ambler, Pa.; Robert P. Stawicki, Brick, N.J.

[73] Assignee: AT&T Bell Laboratories, Murray Hill, N.J.

[21] Appl. No.: 936,484

[22] Filed: Aug. 28, 1992

[51] Int. Cl.$^5$ .................... G02B 6/12; B31B 1/60; H01K 3/10

[52] U.S. Cl. ........................... 385/76; 385/14; 385/49; 385/51; 385/52; 385/89; 385/90; 385/91; 385/147; 174/259; 156/60; 156/158; 29/846; 29/850

[58] Field of Search .......... 385/88, 89, 90, 91, 385/76, 80, 49, 50, 51, 52, 55, 147, 95, 14; 174/68.1, 250, 255, 259, 261; 156/60, 73.2, 158, 159, 160; 29/846, 850

[56] References Cited

U.S. PATENT DOCUMENTS

| | | | |
|---|---|---|---|
| 3,777,154 | 12/1973 | Lindsey | 385/14 X |
| 3,872,236 | 3/1975 | Swengel, Sr. et al. | 385/147 X |
| 4,005,312 | 1/1977 | Lemelson | 385/14 X |
| 4,450,623 | 5/1984 | Burr | 174/68.5 X |
| 4,541,882 | 9/1985 | Lassen | 156/150 |
| 4,693,778 | 9/1987 | Swiggett et al. | 156/361 |
| 4,859,807 | 8/1989 | Swiggett et al. | 174/68.5 |
| 5,009,476 | 4/1991 | Reid et al. | 385/14 X |
| 5,155,785 | 10/1992 | Holland et al. | 385/24 X |
| 5,163,108 | 11/1992 | Armiento et al. | 385/89 |
| 5,181,263 | 1/1993 | Derfiny | 385/49 X |
| 5,185,835 | 2/1993 | Vial et al. | 385/49 |
| 5,204,925 | 4/1993 | Bonanni et al. | 385/89 |
| 5,208,885 | 5/1993 | Dragone et al. | 385/49 |

OTHER PUBLICATIONS

"Electro-Optical Board Technology Based on Discrete Wiring," by W. Delbare et al., presented at 1991 International Electronics Packaging Conference, Sep. 17, 1991.

*Primary Examiner*—Brian Healy
*Attorney, Agent, or Firm*—Roderick B. Anderson

[57] ABSTRACT

Apparatus for routing optical fiber comprises an elongated manipulator (20, FIG. 2) having a vertical axis which can be controlled to move in an X-Y plane and in the $\theta$ direction around its vertical axis. A rotatable wheel (21) is mounted on a free end of the manipulator, and a reel (19) containing optical fiber (17) is mounted on one side of the manipulator. The fiber is threaded over a peripheral portion of the wheel and the wheel presses the fiber against an adhesive-coated surface of a substrate (18) to cause it to adhere to the coated surface. The manipulator is then moved in a direction parallel to the flat surface at an appropriate speed and direction to cause the wheel to rotate and to exert tension on the optical fiber. The tension causes additional optical fiber to unwind from the reel and to be fed to the wheel for adherence to the coated surface, thereby to form a continuous optical fiber portion extending along, and adhered to, the coated surface.

24 Claims, 6 Drawing Sheets

OPTICAL FIBER INTERCONNECTION APPARATUS AND METHODS OF MAKING INTERCONNECTIONS

TECHNICAL FIELD

This invention relates to optical fiber interconnections and, more particularly, to optical backplanes.

BACKGROUND OF THE INVENTION

Electronics systems are typically organized by mounting various system components on printed wiring boards and interconnecting the printed wiring boards with a circuit transmission component known as a backplane. As the circuit density of printed wiring boards increases, it becomes increasingly difficult to provide the needed backplane interconnections because, as interconnection transmission lines become thinner, their impedances increase. Moreover, the distance over which information must be transmitted by backplane conductors is normally fairly long compared to the distances transmitted on the printed wiring boards. These factors may reduce the speed at which circuits can be operated, which may defeat a principal advantage of higher circuit densities.

The copending applications of Holland et al., Ser. No. 07/785,112, field Oct. 30, 1991, now U.S. Pat. No. 5,155,785, granted Oct. 13, 1992, and Bonanni et al., Ser. No. 07/757,870, filed Sep. 11, 1991, now U.S. Pat. No. 5,204,925, granted Apr. 20, 1993, hereby incorporated herein by reference, describe the use of "optical" backplanes comprising optical fibers mounted on a substrate for interconnecting printed wiring boards. The electrical energy of each printed wiring board is translated to optical energy which is transmitted by an optical fiber on the optical backplane to another printed wiring board where it is translated back again to electrical energy for transmission on the other printed wiring board. Because optical fibers can transmit much greater quantities of information than electrical conductors, and with significantly less loss, such optical backplanes have a promising future. They could, of course, also be used to interconnect optical wiring boards, that is, circuit components on which signals are transmitted optically, and other electrical circuit modules such as multi-chip modules and hybrid integrated circuits.

Even though the use of optical backplanes tends to simplify the interconnection problem, the optical fiber interconnections on a backplane may still be very complex and relatively difficult to fabricate. There has therefore been a long-felt need in the industry for methods for fabricating optical fiber backplanes that are amenable to mass production, that reduce the operator skill required for fabrication, and in which the optical fiber lengths are adequately precise. In many modern digital systems, deviations in optical fiber length may result in timing and synchronization errors. Various machines are available for automatically routing and bonding electrical wire to a substrate, but, in general, these machines cannot be adopted for optical fiber use because of the relative fragility of optical fiber and its relative inability to withstand heat and pressure, abrupt turns, etc.

SUMMARY OF THE INVENTION

An illustrative embodiment of the invention uses an elongated manipulator having a vertical axis which can be controlled to move in an X-Y plane and in the $\theta$ direction around its vertical axis. A rotatable wheel is mounted on a free end of the manipulator, and a reel containing optical fiber is mounted on one side of the manipulator. The fiber is threaded over a peripheral portion of the wheel and the wheel presses the fiber against an adhesive-coated surface of a substrate to cause it to adhere to the coated surface. The manipulator is then moved in a direction parallel to the flat surface at an appropriate speed and direction to cause the wheel to rotate and to exert tension on the optical fiber. The tension causes additional optical fiber to unwind from the reel and to be fed to the wheel for adherence to the coated surface, thereby to form a continuous optical fiber portion extending along, and adhered to, the coated surface.

The continuous optical fiber is routed in a complex pattern by changing the direction of motion of the manipulator. Various loops are formed along the edge of the continuous optical fiber pattern. After the formation of the single continuous optical fiber pattern, the fiber is severed from the manipulator. The substrate is then cut along a line which severs the loops so as to form a large plurality of optical fiber interconnections crossing the backplane surface in the desired manner. An advantage of laying the fiber along one continuous path in this manner is that, prior to severing the loops, all the fiber can be tested in a single operation by directing light through the single continuous fiber. Any break or other serious anomaly in the fiber would of course be detected during the testing. After testing, the substrate is severed, as described before, and it can be assumed that the various optical fiber links thus formed are capable of properly transmitting light.

These and other objects, features and advantages of the invention will be better understood from a consideration of the following detailed description taken in conjunction with the accompanying drawing.

DETAILED DESCRIPTION

The various components as shown in the drawings are not necessarily drawn to scale, and in some cases dimensions have been purposely distorted to aid in clarity of exposition. Referring of FIG. 1, there is shown schematically an electronic system comprising a plurality of printed wiring boards 11 which are interconnected by optical fiber ribbons 12 and a pair of optical backplanes 13. The printed wiring boards 11 constitute part of an electronic switching system and, as such, comprise electronic circuits and other electrical components. At the edges of the printed wiring boards, outgoing electrical energy is converted to optical energy for transmission by the optical backplane or the optical fiber ribbons, and incoming optical energy is converted to electrical energy for processing within the printed wiring board. The above-mentioned application of Holland et al., for example, shows how optical fibers can be coupled to photodetectors for conversion of optical energy to electrical energy, and how lasers can be coupled to the optical fibers for converting electrical energy to optical energy for transmission by optical fibers.

Figure 1:
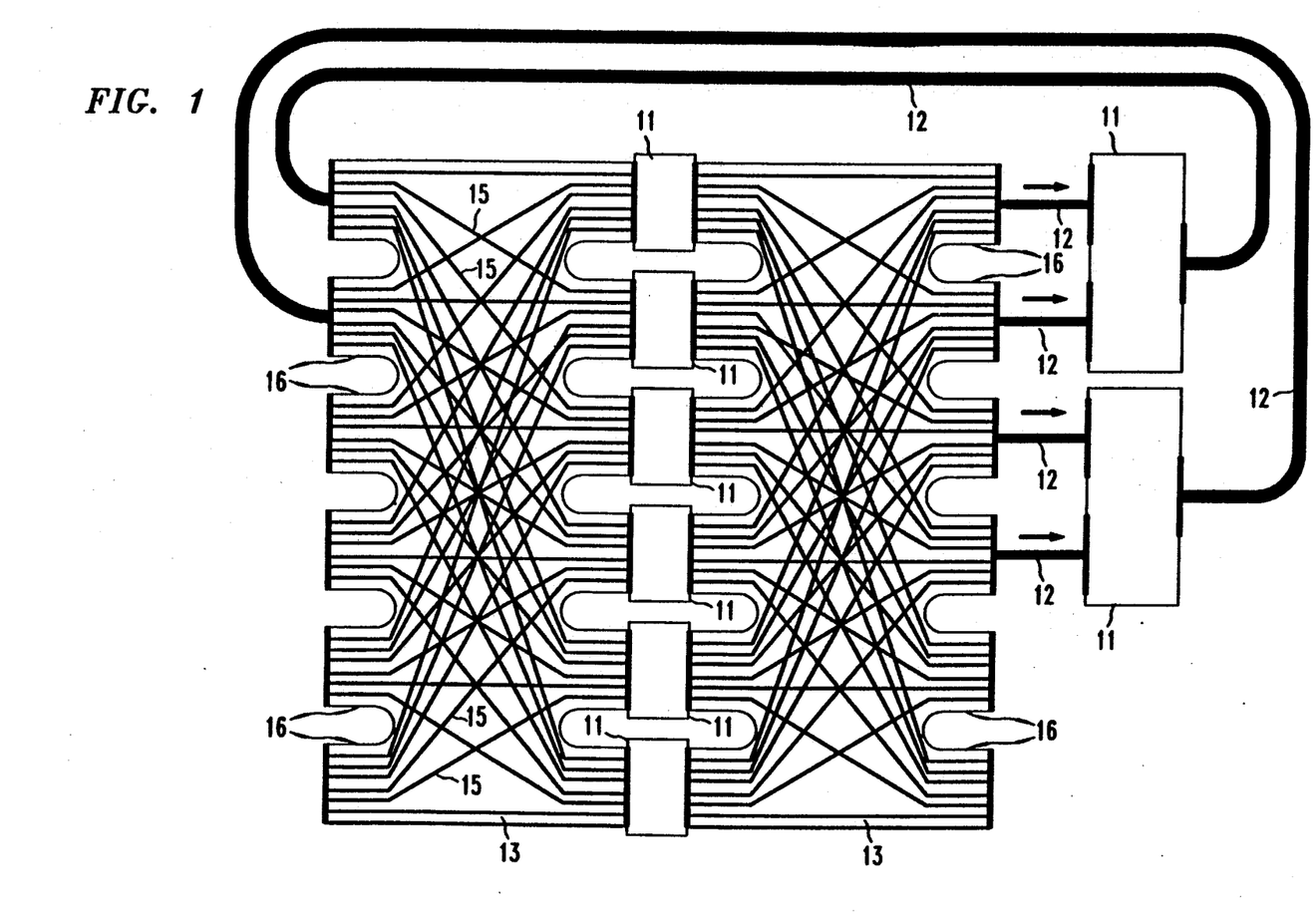
FIG. 1 is a schematic view of an electronic system comprising printed wiring boards interconnected by optical backplanes.

As described in the aforementioned Bonanni et al. application, optical backplanes 13 comprise optical fibers 15 which interconnect opposite ports or tabs 16 of the optical backplanes. The optical fibers are supported on a flexible substrate which is then coated with adhesive to which the optical fibers adhere. The substrate is preferably a polymer of the type commercially identified by the trademark "Kapton." Because the optical backplanes are made of a flexible material, they can be bent for mounting in an appropriate structure to reduce the volume required by the system and to aid in connection to other electronic systems of an electronic switching machine.

Although some of the tabs 16 of the optical backplane are shown as not being used, it is nevertheless desirable that all of the optical fibers shown be mounted to provide access to additional components that may be added to the system. Further, it is desirable that three optical fibers be included for each optical fiber 15 which is shown. This allows for a plurality of input-output ports for each printed wiring board, with one optical fiber transmitting input energy, one optical fiber transmitting output energy, and one optical fiber transmitting a clock signal for synchronization purposes. For clarity, only one of the three optical fibers extending along each path have been shown. Some of the optical fiber paths have been shown with heavy lines or dotted lines as a further aid in understanding the layout. It is intended that each port or tab 16 of the optical backplane contains six groups of three fibers each, or a total of eighteen optical fibers. The optical fibers are two hundred fifty microns in diameter and, as is discussed in the aforementioned Holland et al. application, each fiber must have an appropriately large curvature for each change of direction to avoid damage to the fiber. Thus, the acute changes of direction of the optical fiber routing shown should, in actual practice, be more gradual changes of direction.

In implementing the FIG. 1 embodiment, each of the optical fibers 15 have been manually placed on the adhesive-coated substrate. Care has to be taken so that each optical fiber in each group of three fibers is of the same length to avoid synchronization errors in the data transmitted and received. Although all of the backplanes 13 may be identical in structure, mass-production apparatus of the prior art has been found to be unsatisfactory for making such backplanes automatically, due primarily to the fragility of optical fiber.

Figure 2:
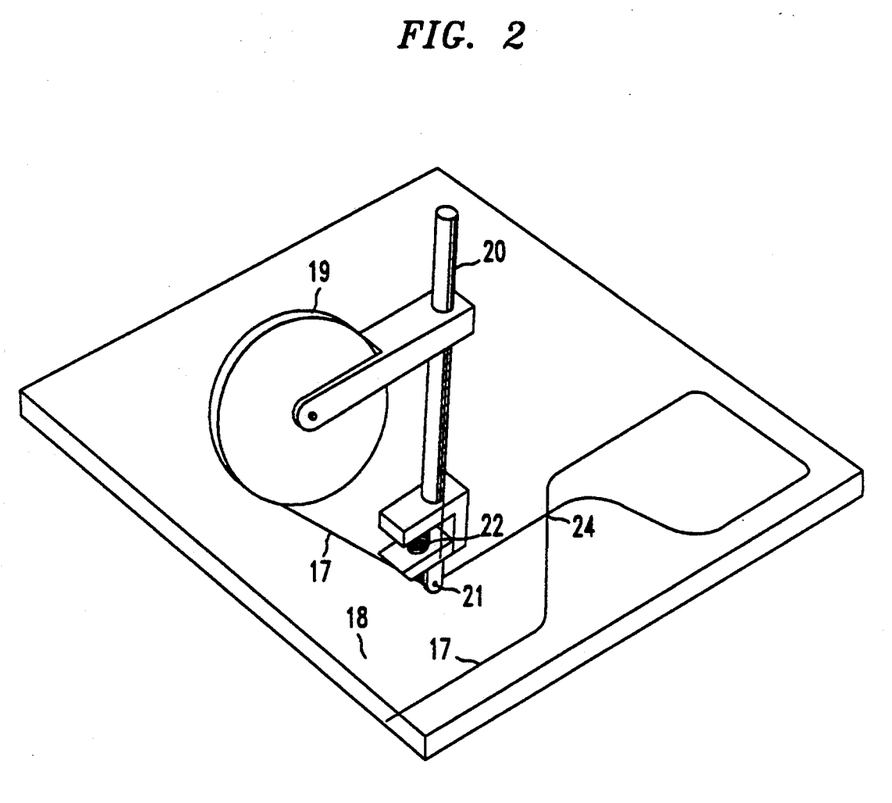
FIG. 2 is a view of apparatus for routing optical fibers or an optical backplane in accordance with an illustrative embodiment of the invention.

Referring to FIG. 2, there is shown schematically apparatus for routing optical fiber 17 on an adhesive-coated substrate 18 in accordance with an illustrative embodiment of the invention. A reel 19 of optical fiber is mounted on the side of a manipulator 20 which is capable of moving parallel to the X-Y plane of the surface of substrate 18 and of rotating about a central vertical axis. Mounted on an end of manipulator 20 is a wheel 21 over which the optical fiber 17 is threaded. Reel 19 and wheel 21 are located in the same plane of rotation, and the plane of rotation can rotate with manipulator 20.

The optical fiber 17 is initially threaded around wheel 21 and the wheel 21 is pressed against the adhesive-coated upper surface of substrate 18. The manipulator 20 then moves parallel to the upper surface of substrate 18. As it moves, friction causes the wheel 21 to rotate which exerts tension on optical fiber 17 causing the reel 19 to rotate. In this manner, as the manipulator is moved, optical fiber is fed from reel 19 to wheel 21 for adherence to the upper surface of substrate 18. Manipulator 20 is rotatable in a $\theta$ direction around its central axis. When one desires to change the direction, one rotates the manipulator 20 to "steer" the wheel 21 in a direction to be moved. The change of direction should be sufficiently gradual to avoid undue stress on the optical fiber 18. When the manipulator 20 is rotated, reel 19 and wheel 21 are rotated with it so that their planes of rotation remain parallel with the direction of movement in the X-Y plane.

We have found that, with reel 19 being freely rotatable, the tension exerted on optical fiber 17 is not sufficient to damage it. That is, the tension is accommodated by the rotation of reel 19 which unwinds optical fiber from the reel. A spring 22 in the manipulator permits vertical movement of wheel 21 to accommodate crossovers, such as that shown at location 24, without stressing unduly the optical fiber.

Figure 3:
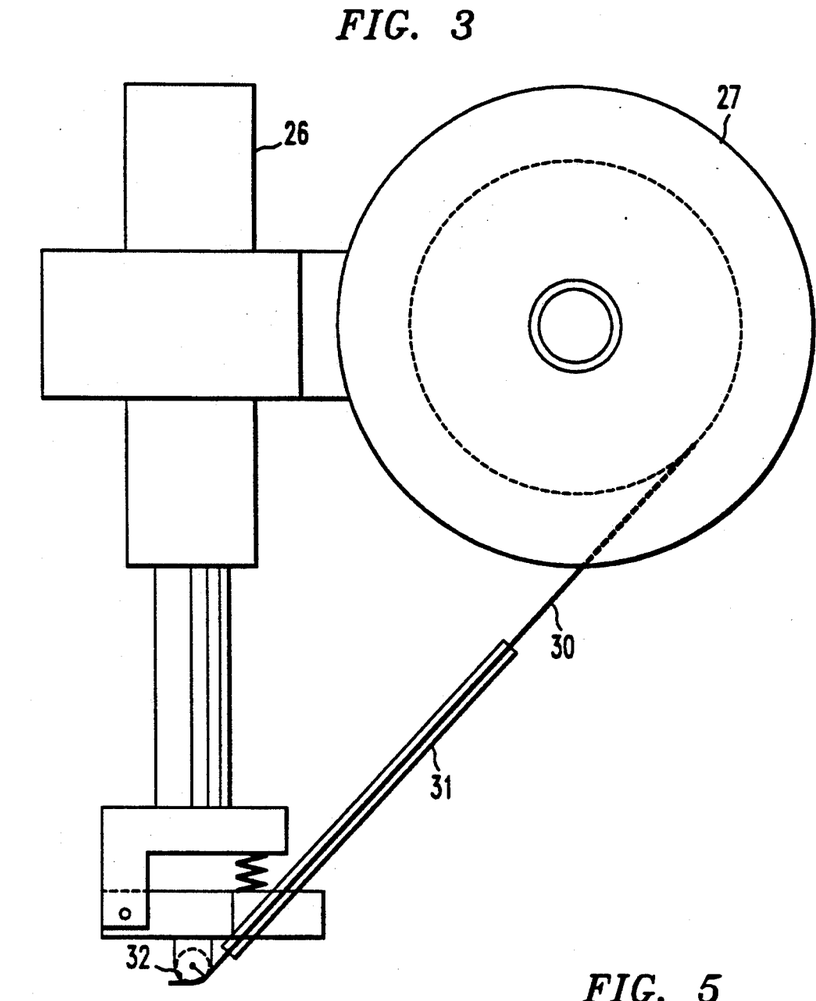
FIG. 3 is a side view of optical fiber routing apparatus in accordance with an illustrative embodiment of the invention.
Figure 4:
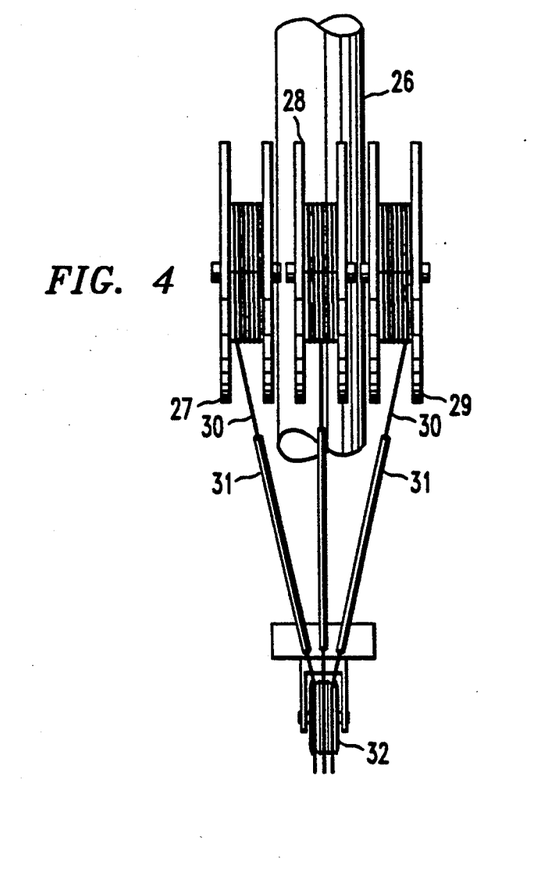
FIG. 4 is a front view of the apparatus of FIG. 3.
Figure 5:
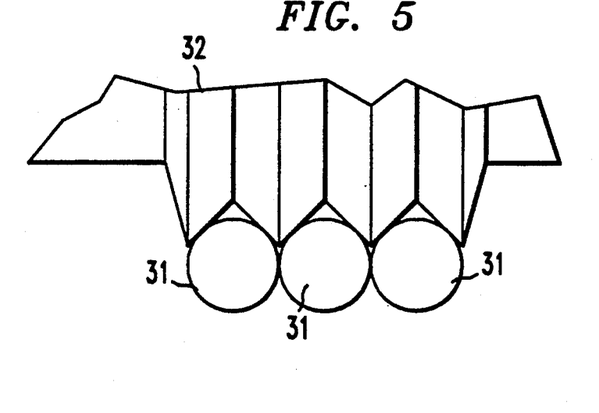
FIG. 5 is an expanded view of part of the fiber routing wheel of the apparatus of FIG. 3.

An important advantage of the method of FIG. 2 is that it can be implemented with commercially available robotic apparatus. Specifically, apparatus shown in somewhat more detail in FIGS. 3 and 4 was mounted on one of the manipulators of an FWS-200 flexible robotic workstation, a product of AT&T; a similar product is commercially available from the Megamation Company of Princeton, N.J. This is a gantry style robot designed for precise positioning of moderate weight work pieces. The X-Y motion of the manipulator is produced by linear stepper motors that ride on an air bearing. Z motion is produced through a lead screw, and $\theta$ motion is produced by a dc servo motor with encoder feedback. Referring to FIG. 3, a mounting rod 26 was mounted at the end of the robot manipulator. Mounted on the side of the mounting rod 26 are three optical fiber reels 27, 28 and 29, each of which feeds optical fiber 30 through optical fiber guides 31 to a wheel 32. As shown in the detail of FIG. 5, wheel 32 comprises three peripheral grooves for containing each of the three optical fibers 31. By including three reels, it is possible to lay three optical fibers side by side on the substrate which is desirable for the reasons described above. The lengths of the three fiber sections can be made to be of equal length with a very high degree of accuracy in this manner. The three reels 27–29 are independently rotatable to permit slight differences of angular velocity, as is required when a curved path is being formed.

Figure 6:
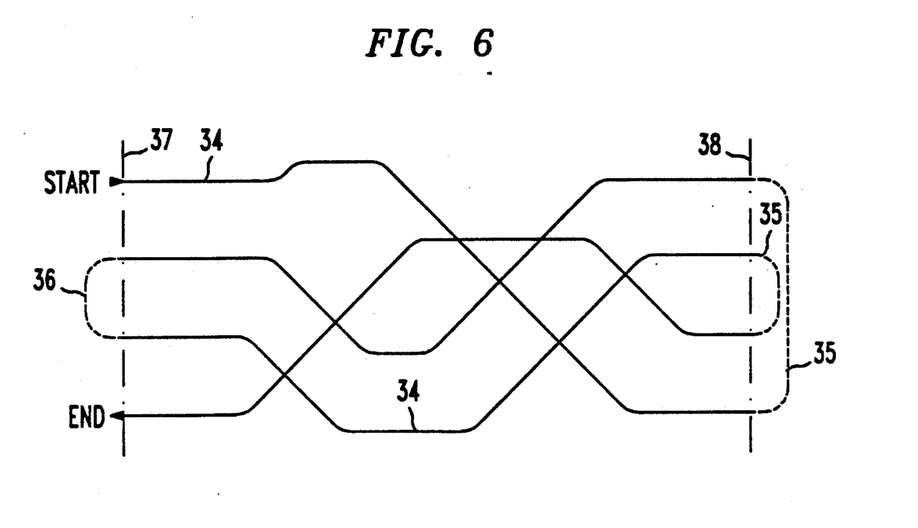
FIG. 6 is a schematic view of an illustrative optical fiber routing pattern in accordance with one embodiment of the invention.

Another advantage of the method of FIG. 2 is that it facilitates the formation and testing of a plurality of interconnections extending across a backplane. This is illustrated in FIG. 6 in which optical fiber 34 represents a single continuously laid optical fiber path. The continuous path is formed by laying the fiber such that it forms loops 35 and 36 on opposite sides of the pattern. Notice that to form the pattern, the manipulator 20 of FIG. 2 must be rotated on its $\theta$ axis by more than three hundred sixty degrees. After the continuous optical fiber 34 has been laid, the substrate, along with the optical fiber 34 overlying it, is cut along lines 37 and 38. After the cut, it can be seen that four distinct optical fiber interconnections are provided between lines 37 and 38 due to the severing of loop portions 35 and 36.

Forming the optical fiber interconnections in this manner has two distinct advantages. First, it is not necessary to sever the fiber and rethread the fiber after each interconnection has been defined; rather, they are all defined by a single continuous operation that begins at the location labeled "start" and finishes at the location labeled "end." Second, all four optical fiber interconnections can be tested in a single operation prior to cutting by directing light in one end such as the "start" end and detecting light from the opposite end, the "end" end. If light has been transmitted satisfactorily, the cuts along lines 37 and 38 can be made and it can be assumed that the four interconnections will operate satisfactorily without requiring individual testing. The optical fiber 34 may, of course, consist of three optical fibers as was described before, all three fibers being laid in a single operation and being tested together.

Figure 7:
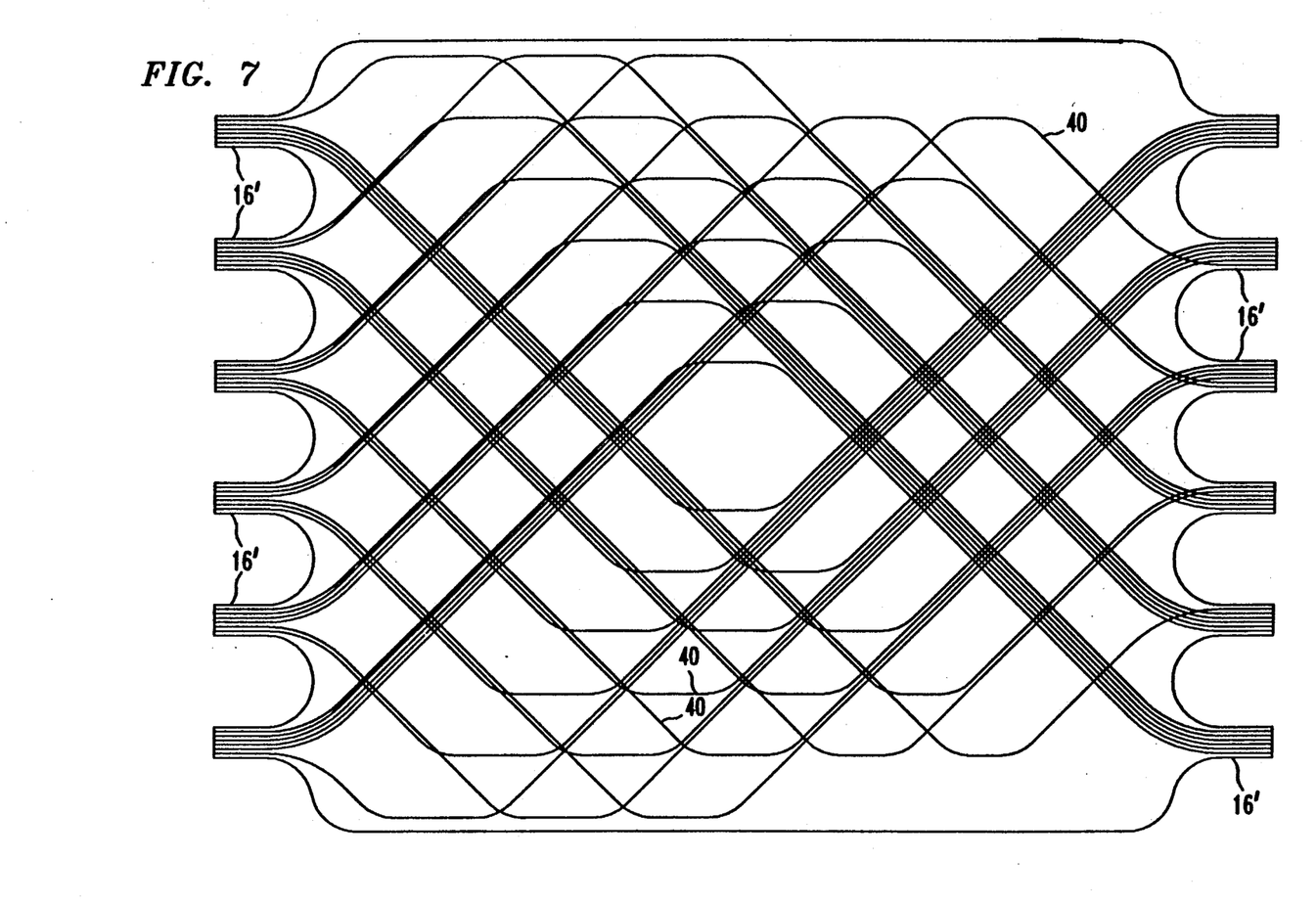
FIG. 7 is a view of an optical fiber routing pattern that can be used to satisfy the routing requirements illustrated in FIG. 1 in accordance with an illustrative embodiment of the invention.

The principle illustrated in FIG. 6 is applied in FIG. 7 to generate an optical fiber pattern 40 that will perform the interconnection function of one of the optical backplanes 13 of FIG. 1. The pattern is formed on a substrate having ports or tabs 16' that correspond to the tabs 16 of FIG. 1. When the pattern 40 is being routed, coated substrate portions are located to the left of the left-most tabs 16' and to the right of the right-most tabs 16'. Thus, as each optical fiber routing traverses one of the tabs 16', it makes a loop and doubles back onto another tab 16' in the manner illustrated in FIG. 6. The entire pattern 40 is made with a single optical fiber, or alternatively with three side-by-side fibers, that are laid continuously to form a single continuous pattern. After, the single continuous pattern has been formed, it is tested as described before by directing light through the three continuous optical fibers that make up the pattern. The substrate is then cut to sever the loops on the extreme portions of the pattern and thereby to define the ends of tabs 16' on opposite sides of the pattern. The various curves within the pattern 40 are designed to provide appropriate lengths for the various optical fiber transmission lines constituting the pattern 40.

Figure 8:
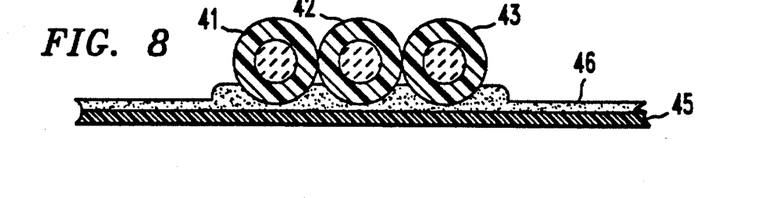
FIG. 8 is a schematic cross-sectional view of optical fibers which have been adhered to a substrate in accordance with an illustrative embodiment of the invention.

FIG. 8 shows a cross-sectional view of three fibers 41, 42 and 43 which may make up the pattern 40 of FIG. 7. Each fiber is a conventional dual acrylic coated glass fiber having a total outside diameter of two hundred fifty microns. The substrate 45 is preferably made of a flexible material such as Kapton having a thickness of 0.002 inch. Other materials such as Mylar (a trademark) could be used, but Kapton was found to have both added dimensional stability and flame retardancy compared to Mylar. Coated on the substrate 45 was a pressure-sensitive adhesive 46 which may, for example, be number 711 adhesive, available from the Adchem Corporation of Westbury, N.Y. This is an acrylic adhesive supplied on coated release paper. This adhesive requires the application of some pressure for adhesion and is therefore easier to work with than conventional adhesive.

Figure 9:
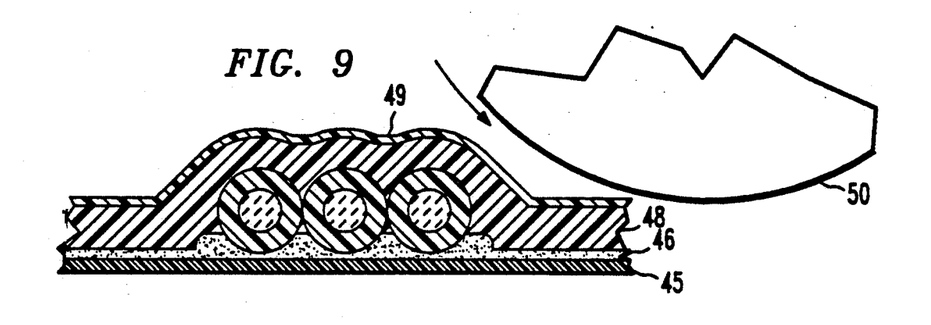
FIG. 9 illustrates a method for encapsulating the optical fibers of FIG. 8.

After routing, the optical fibers were encapsulated by a layer 48 of thermoplastic material as shown in FIG. 9. Over the thermoplastic material, another thin layer 49 of Kapton, 0.001 inch in thickness, was placed. A roller 50 was heated sufficiently to cause the thermoplastic material to flow around the optical fibers as shown. The thermoplastic material 48 is preferably a polyurethane, commercially available as number 3205 from Bemis Associates of Shirley, Mass. This material could be flowed at a temperature low enough to avoid damage to the optical fibers and provided good moisture protection to the optical fibers.

The FWS-200 flexible workstation that was used for controlling the manipulator is controlled by a stored computer program using the Modular Manufacturing Language, a language similar to BASIC. Although the Modular Manufacturing Language contains commands for coordinated straight moves, it does not have the capability of making radius moves. For this purpose, software routines were devised and written to approximate the continuous arc by a series of short and equal linear movements. Trigonometric relations were used to linearly interpolate a forty-five degree arc segment in thrity equal angular steps (1.5 degree each). A numerical file containing the corresponding series of X and Y increments was tabulated. Because of the resolution limit in the X-Y motion, it was necessary to insure that all vectors and arcs join together to form traces of the proper dimensions. This was achieved by rounding all incremental movements to the nearest 0.001 inch and slightly adjusting values to sum to the overall dimensions of 0.707 by 0.293 inches. This data file was the basis for all possible orientations and directions of forty-five degree arc segments, obtained through a series of sixteen subroutines using proper phasing and sign of the motion.

For placing fibers in array, a problem arose from the fact that three fibers have an overall width of approximately 0.0295 inch and the manipulator is limited to steps of 0.001 inch. Whrn fiber groups were placed using a spacing of 0.030 inch, small gaps occurred as all six groups were laid and the resulting eighteen-wide array was not acceptable. This problem was overcome by taking advantage of the compliant nature of the tacky adhesive, allowing the fiber to "slide" a small amount laterally. Fiber groups were laid in a staggered fashion by alternating the pitch by 0.030 and 0.029 inches, resulting in close packing in the array. One may increase the resolution of the linear motors to 0.0001 inch which will overcome this problem. During the fiber routing, the speed of the wheel 32 was limited to the range of one to five inches per second.

Described below is a summary of the process flow used for making the flexible optical circuits.

1. The acrylic transfer adhesive (10.8 inch wide on paper release liner) was pressure laminated onto Type HN Kapton film (12 inches wide).

2. An FR4 board (12 by 24 inches) was thoroughly cleaned with solvent, dried, and lightly sprayed with 3M ® spray adhesive.

3. The Kapton/Adhesive material was rolled under pressure onto the board with the Kapton side against the board. Edges were trimmed and taped to secure the sheet.

4. The board was positioned onto the work area and clamped.

5. The paper liner was removed to expose the pressure sensitive adhesive.

6. The manipulator wheel was threaded with optical fiber.

7. Under software control, the manipulator lowers to contact the wheel to the board, routes fiber groups, and raises at endpoint.

8. Manually assisted operations include cutting, releasing, and re-threading the fiber.

9. Routed board is removed from work area and covered with one sheet of 0.005 inch polyurethane and one sheet of 0.001 inch Kapton.

10. Board is laminated between heated rollers at a speed of about five inches per minute, temperature of one hundred fifty degrees Centigrade, and a pressure of ten to thirty pounds per square inch.

11. Razor bade and metal template was used to cut border and tab edges.

12. Completed circuit was separated from carrier board and cleaned.

Figure 10:
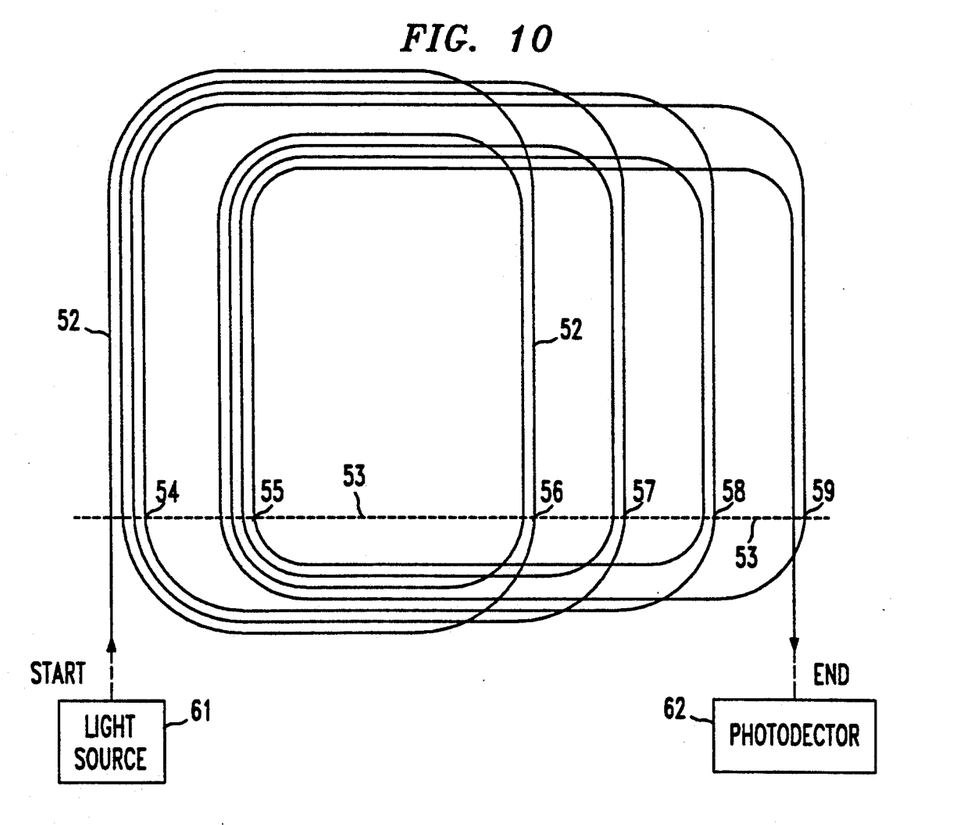
FIG. 10 is a schematic view showing an optical fiber routing pattern in accordance with another embodiment of the invention.

Referring to FIG. 10, there is shown another optical fiber routing method for making a "fan-out" arrangement of transmission lines in which the transmission lines of one input port are directed to each of several output ports. The optical fiber path 52 is a continuous path which is begun at the end labeled "start" and ends at the location labeled "end." After the continuous path 52 has been made, the optical fiber is tested as, for example, by directing light from a source 61 into one end of the fiber and detecting the light with a photodetector 62. Next, the substrate and the optical fiber on it are cut along line 53. After cutting, it can be seen that two input port regions 54 and 55 have been made, each of which comprise four optical fibers with optical fibers from each of the input ports being directed to all of the output ports 56–59. As before, the plurality of optical fiber lengths are made from a single continuous fiber by including a plurality of loop regions which are cut or severed by the cutting along line 53. The optical fiber path 52 may, as before, comprise one, two, three or more optical fibers.

The various embodiments which have been described are intended to be merely illustrative of the inventive concepts involved. The substrate used for the optical backplane may be of any of various materials which may be flexible or inflexible. While it is convenient to use a pressure-sensitive adhesive on the substrate, conventional adhesives could alternatively be used. The materials and methods described for encapsulating the optical fibers have been found to be consistent with requirements for protection from the environment, particularly moisture, and have been found to adhere well under rigorous conditions, but various other encapsulation methods could alternatively be used. In theory, the method of FIG. 2 could be practiced manually which would be an improvement over manual fabrication of the FIG. 1 embodiment, but, as mentioned before, a principal advantage of the method is its amenability to robotic implementation. The reel 19 illustrated in FIG. 2 has been found to be a convenient way of feeding out optical fiber in response to small increments of optical fiber tension so that undue stresses on the relatively fragile-fiber are avoided, but other containers or magazines for optical fiber could probably alternatively be developed. A principal advantage of the method of FIG. 2 is that patterns such as that shown in FIG. 6 can be applied as a single continuous optical fiber which may then be conveniently tested, but individual interconnection lines can be made by the method of FIG. 2 in which the optical fiber is severed after each interconnection is made. Various other embodiments and modifications may be made by those skilled in the art without departing from the spirit and scope of the invention.

We claim:

1. A method for making optical interconnections comprising the steps of:

coating a flat surface of a substrate with an adhesive;

mounting a container of optical fiber on a manipulator;

mounting a rotatable wheel on an end of the manipulator;

threading one end portion of said optical fiber from said container over a peripheral portion of said wheel;

moving the manipulator such that said peripheral portion of the wheel presses said one end portion of the optical fiber against the adhesive-coated surface of the substrate, thereby to cause said first end portion of the optical fiber to adhere to said coated surface;

and moving the manipulator in a direction parallel to said flat surface at an appropriate speed and direction to cause the wheel to rotate and to exert tension on said optical fiber, said tension causing additional optical fiber to feed from the container to the wheel for adherence to said coated surface, thereby to form an optical fiber portion extending along, and adhered to, said coated surface;

and severing the optical fiber adhered to the coated surface from that contained on the manipulator.

2. The method of claim 1 wherein:

the container is a rotatable reel upon which the optical fiber is wound;

and said tension causes the reel to rotate, thereby to feed additional optical fiber to the wheel.

3. The method of claim 1 wherein:

the wheel has a groove extending around its periphery to hold the optical fiber in place.

4. The method of claim 1 wherein:

the wheel rotates in a plane of rotation, said plane of rotation being substantially parallel to the direction of movement of said manipulator and substantially perpendicular to said flat surface.

5. The method of claim 4 further comprising the steps of:

changing the direction of movement of the manipulator and simultaneously changing the plane of rotation appropriately to maintain the plane of rotation substantially parallel to the direction of movement of said manipulator.

6. The method of claim 2 wherein:

the adhesive is a pressure sensitive adhesive.

7. The method of claim 2 wherein:

the first mounting step comprises the steps of mounting three rotational reels each containing optical fiber on the said manipulator, the three reels having parallel planes of rotation;

the wheel has three grooves;

the threading step comprises the step of threading optical fiber from each of the three reels to a different one of the three grooves;

and the moving step causes the wheel to exert tension on optical fiber from all of the three reels to cause such reels to feed additional optical fiber to the wheel for adherence to the coated surface, thereby to form three parallel optical interconnections extending along the coated surface.

8. The method of claim 1 wherein:
the moving step comprises the step of moving the manipulator to form a pattern of continuous optical fiber on said coated substrate; and further comprising the steps of:
testing the light transmission capability of said continuous optical fiber adhered to the coated substrate;
and thereafter cutting the substrate and the optical fiber adhered thereto to form a plurality of optical fiber interconnections extending along the coated surface.

9. The method of claim 8 wherein:
the testing step comprises the step of directing light in one end of said continuous optical fiber and detecting light emerging from another end of said continuous optical fiber.

10. The method of claim 9 further comprising the step of:
after the substrate cutting step, using at least some of said plurality of light interconnections to transmit light from one region of the substrate to another region of the substrate.

11. A method for making a plurality of optical interconnections on a substrate comprising the steps of:
locating one end portion of an optical fiber on a bonding tool;
using the bonding tool to bond said one end portion of the optical fiber to the substrate;
causing relative movement between the substrate and the bonding tool;
feeding optical fiber to the bonding tool during said movement;
during said movement, using the bonding tool to bond the optical fiber to the substrate, whereby a continuous optical fiber path is formed on the surface of the substrate having a configuration related to said relative movement;
changing the direction of said relative movement so as to cause the continuous optical fiber path to form a plurality of loops;
said changing of direction being sufficiently gradual to avoid damaging the optical fiber;
testing the light transmission capability of said continuous optical fiber path;
and thereafter cutting the substrate to sever the optical fiber path;
said cutting being along a line that extends across at least certain ones of said loops, thereby to form a plurality of independent optical fiber interconnections on the surface of the substrate.

12. The method of claim 11 wherein:
the testing step comprises directing light into one end of the continuous optical fiber path and detecting light emerging from an opposite end thereof.

13. The method of claim 12 further comprising the step of:
covering the substrate with pressure-sensitive adhesive; and wherein:
the bonding step comprises the step of pressing the optical fiber against the pressure-sensitive adhesive.

14. The method of claim 13 further comprising the steps of:
covering the bonded optical fibers with a layer of thermoplastic material;
and moving at least one heated roller over a top surface of the thermoplastic layer to cause said layer to adhere to the substrate and to said optical fibers.

15. The method of claim 14 further comprising the steps of:
covering the layer of thermoplastic material with a cover layer; and wherein:
the heated roller moving step comprises the step of contacting the heated roller to an upper surface of the cover layer.

16. The method of claim 15 wherein:
the thermoplastic layer is polyurethane;
and the cover layer is Kapton.

17. A method for making optical interconnections comprising the steps of:
mounting on a bonding member a freely rotatable reel upon which is wound a continuous optical fiber;
said bonding member including a grooved rotatable wheel on one end thereof;
unreeling optical fiber from the reel and compressing one end portion of the optical fiber between a groove of the rotatable wheel and an adhesive-coated substrate surface;
causing relative movement between the substrate and the bonding member thereby to exert a tension on the optical fiber and cause it to unreel from the reel;
during the step of causing the relative movement, using the grooved rotatable wheel of the bonding member to compress the optical fiber against the coated surface, thereby to adhere to the coated surface that optical fiber unreeled from the reel.

18. The method of claim 17 wherein:
the mounting step comprises the step of mounting at least two independently rotatable reels of optical fiber on the bonding member;
the unreeling step comprises the step of unreeling optical fiber from both of said reels and compressing optical fiber from both of said reels between the bonding member and the adhesive-coated substrate surface;
and during the step of causing relative movement, using the bonding member to compress the optical fiber from both reels against the coated surface, thereby to adhere to the coated surface that optical fiber unreeled from both reels.

19. The method of claim 18 wherein:
the bonding member includes at one end thereof a wheel having at least two peripheral grooves;
the optical fiber from one reel is located on one of said grooves and the optical fiber from the other reel is located on the other of said grooves;
and optical fiber from both reels is compressed by the wheel against the coated surface, whereby two optical fiber interconnection of substantially the same length are formed on the coated substrate.

20. Apparatus for making optical interconnections comprising:
a manipulator having a vertical central axis, the manipulator being moveable in X-Y directions and in a $\theta$ direction around the central axis;
a rotatable wheel mounted at one end of the manipulator, the wheel being rotatable on an axis that is transverse to the central axis of the manipulator;

a reel of optical fiber mounted on the manipulator vertically above said wheel;

said reel being freely rotatable such that optical fiber therefrom may be threaded over a peripheral portion of said wheel;

said wheel comprising means for pressing the optical fiber against a flat surface of a substrate coated with an adhesive;

means for moving the manipulator in a direction parallel to said flat surface at an appropriate speed and direction to cause the wheel to rotate and to exert tension on said optical fiber, said tension causing additional optical fiber to unreel from the container to the wheel for adherence to said coated surface, thereby to form an optical fiber portion extending along, and adhered to, said coated surface.

21. The apparatus of claim 20 wherein:

the wheel has a groove extending around its periphery to hold the optical fiber in place;

the wheel rotates in a plane of rotation, said plane of rotation being substantially parallel to the direction of movement of said manipulator and substantially perpendicular to said flat surface.

22. The apparatus of claim 21 further comprising:

means for changing the direction of movement of the manipulator;

said direction changing means comprising means for rotating the manipulator on its central axis to maintain the plane of rotation of the wheel substantially parallel to the direction of movement of said manipulator.

23. The apparatus of claim 22 wherein:

the means for changing the direction of movement of the manipulator comprises means for changing the direction of movement through more than three hundred sixty degrees.

24. The apparatus of claim 23 wherein:

the movement of said manipulator is controlled by a stored computer program.

* * * * *